(12) United States Patent
Vasavada et al.

(10) Patent No.: US 10,509,097 B2
(45) Date of Patent: Dec. 17, 2019

(54) CORRECTING SATELLITE POINTING DIRECTION

(71) Applicant: Hughes Network Systems, LLC, Germantown, MD (US)

(72) Inventors: Yash M. Vasavada, Gaithersburg, MD (US); Channasandra Ravishankar, Clarksburg, MD (US); David Roos, Boyds, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 191 days.

(21) Appl. No.: 15/086,357

(22) Filed: Mar. 31, 2016

(65) Prior Publication Data

US 2017/0288753 A1    Oct. 5, 2017

(51) Int. Cl.
*G01S 5/02*     (2010.01)
*H04B 17/318*   (2015.01)
(Continued)

(52) U.S. Cl.
CPC .......... *G01S 5/0247* (2013.01); *H04B 7/0617* (2013.01); *H04B 7/0619* (2013.01);
(Continued)

(58) Field of Classification Search
None
See application file for complete search history.

(56) References Cited

U.S. PATENT DOCUMENTS

| 3,935,574 | A | * | 1/1976 | Pentheroudakis | ........ | G01S 3/48 |
| | | | | | | 342/424 |
| 4,630,058 | A | * | 12/1986 | Brown | ................. | H04B 7/2041 |
| | | | | | | 342/352 |

(Continued)

FOREIGN PATENT DOCUMENTS

EP    0271176 A1    6/1988

OTHER PUBLICATIONS

Y. Loh. "On antenna pointing control for communications satellite", 14th International Communication Satellite Systems Conference and Exhibit, International Communications Satellite Systems Conferences (ICSSC), 1992.*

(Continued)

*Primary Examiner* — Joseph A Bednash
(74) *Attorney, Agent, or Firm* — Bejin Bieneman PLC

(57) ABSTRACT

Each of a plurality of signal measurement circuits is included in a terminal. Each measurement circuit receives a signal from a transmitter in a satellite and measures characteristics of the signal. A computer is programmed to receive data from the signal measurement circuits. The data indicates characteristics of the signal, including a strength of the signal. The computer determines an initial estimated satellite pointing direction, and generates subsequent estimated satellite pointing directions. For the initial and subsequent estimated pointing directions, the strength of the signal received by each measurement circuit is compared with an expected strength of the signal based on the respective estimated pointing direction. Each subsequent estimate (Continued)

is based at least in part on the comparison of the immediately preceding estimate. Based on the comparisons, the computer estimates a current satellite pointing direction.

18 Claims, 9 Drawing Sheets

(51) Int. Cl.
    *H04B 7/06* (2006.01)
    *H04B 7/185* (2006.01)
    *H04W 16/28* (2009.01)
    *G01S 13/87* (2006.01)
(52) U.S. Cl.
    CPC ......... *H04B 7/185* (2013.01); *H04B 7/18513* (2013.01); *H04B 7/18519* (2013.01); *H04B 17/318* (2015.01); *H04W 16/28* (2013.01); *G01S 13/874* (2013.01)

(56) References Cited

U.S. PATENT DOCUMENTS

| | | | | |
|---|---|---|---|---|
| 4,754,280 A * | 6/1988 | Brown | ................... | G01S 19/54 342/357.59 |
| 5,323,322 A * | 6/1994 | Mueller | ............... | G01S 5/0009 342/357.27 |
| 6,014,473 A * | 1/2000 | Hossack | ............... | A61B 8/145 348/169 |
| 6,393,255 B1 * | 5/2002 | Lane | ..................... | H01Q 1/288 342/354 |
| 6,594,582 B1 * | 7/2003 | Quinn | ................... | G01S 5/0247 342/357.36 |
| 6,684,071 B1 * | 1/2004 | Molnar | ................. | H01Q 1/246 455/429 |
| 8,077,629 B2 * | 12/2011 | Miller | ............... | H04B 7/18513 370/252 |
| 8,427,368 B1 * | 4/2013 | Freedman | .......... | H04B 7/18519 342/358 |
| 8,533,576 B1 * | 9/2013 | Wu | ....................... | H04L 1/0041 714/799 |
| 2002/0004691 A1 * | 1/2002 | Kinashi | .................. | G01C 21/24 701/4 |
| 2002/0143253 A1 * | 10/2002 | Robinson | ................ | A61B 8/00 600/437 |
| 2003/0203737 A1 * | 10/2003 | Jarett | ................... | H04B 7/2041 455/450 |
| 2003/0222816 A1 * | 12/2003 | Liu | ........................ | H01Q 3/005 342/359 |
| 2004/0140930 A1 * | 7/2004 | Harles | ..................... | G01S 5/14 342/387 |
| 2005/0261573 A1 * | 11/2005 | Satoh | ................... | G06K 9/3208 600/415 |
| 2006/0209979 A1 * | 9/2006 | Sandell | ............... | H04L 27/2657 375/267 |
| 2007/0027590 A1 * | 2/2007 | Liu | ........................ | G01C 19/00 701/13 |
| 2007/0046537 A1 * | 3/2007 | Tekawy | .................. | G01S 19/02 342/358 |
| 2008/0068263 A1 * | 3/2008 | Tekawy | .................. | G01S 19/53 342/357.36 |
| 2009/0073039 A1 * | 3/2009 | Rideout | .................... | G01S 5/06 342/357.31 |
| 2009/0102708 A1 * | 4/2009 | Dai | ........................ | G01S 19/41 342/357.24 |
| 2009/0190491 A1 * | 7/2009 | Miller | ................ | H04B 7/18513 370/252 |
| 2010/0013703 A1 * | 1/2010 | Tekawy | ................... | G01S 19/02 342/357.395 |
| 2011/0110661 A1 * | 5/2011 | Grubor | .............. | H04B 10/1143 398/38 |
| 2011/0280349 A1 * | 11/2011 | Hong | ................. | H04L 25/0216 375/344 |
| 2014/0067240 A1 * | 3/2014 | Yu | ........................ | B60W 40/13 701/112 |
| 2014/0188774 A1 * | 7/2014 | George | .................... | G06N 7/08 706/46 |
| 2015/0309183 A1 * | 10/2015 | Black | .................... | G01S 19/258 342/357.25 |
| 2016/0320493 A1 * | 11/2016 | Wu | ....................... | G01S 19/41 |
| 2016/0359217 A1 * | 12/2016 | Burdick | ............... | H01Q 1/1257 |
| 2017/0067990 A1 * | 3/2017 | Reed | ....................... | G01S 17/50 |
| 2017/0143494 A1 * | 5/2017 | Mahfouz | ............... | A61B 34/20 |
| 2017/0212243 A1 * | 7/2017 | Darapu | ................... | G01S 19/23 |
| 2017/0316324 A1 * | 11/2017 | Barrett | .................... | G06N 5/04 |

OTHER PUBLICATIONS

International Search Report and Written Opinion of International Searching Authority in PCT/US2017/024729 dated Jul. 4, 2017 (13 pages).

* cited by examiner

CORRECTING SATELLITE POINTING DIRECTION

BACKGROUND

As satellite antennas become larger, the resultant satellite beams, as seen at the earth's surface, become smaller, and require increased pointing accuracy. Satellites may transmit signals to a large number of terminals, e.g., 10 or more. Weak signals, due, for example, to weather conditions, blocking, shadowing, etc., received at one or more of the selected terminals may reduce the accuracy of the pointing direction estimation.

DRAWINGS

Figure 7:
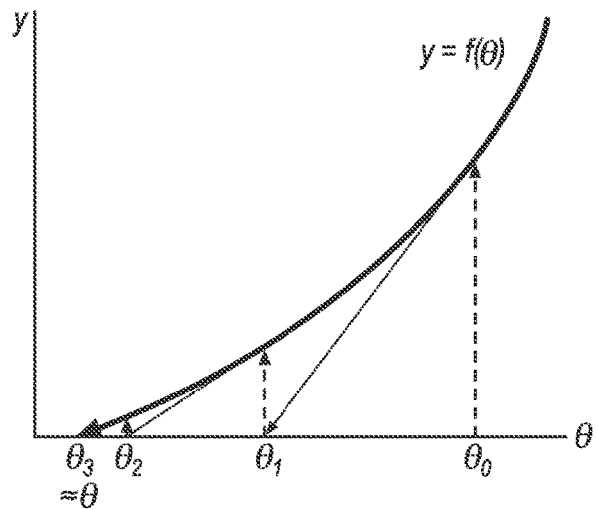

FIG. 7 provides a conceptual illustration of Newton's root-finding method.

Figure 8:
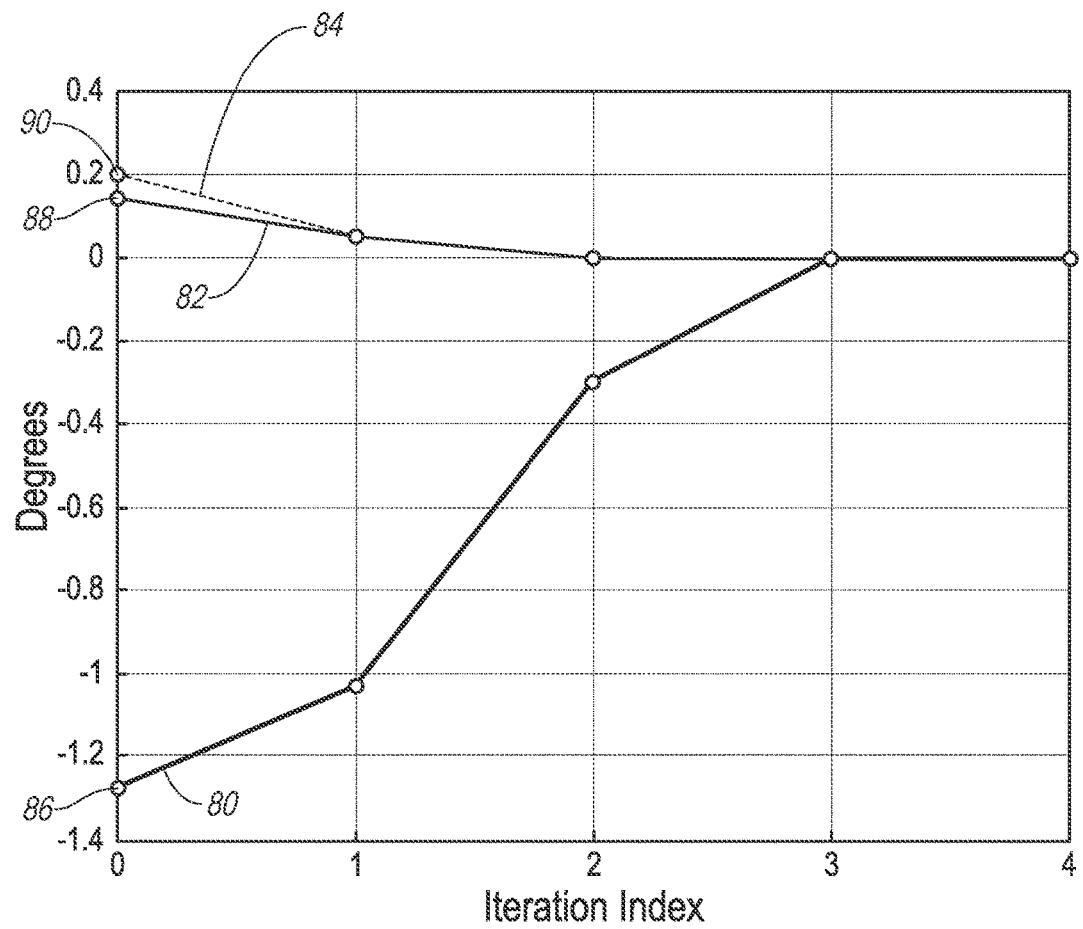

FIG. 8 is a graph indicating simulation results for estimating satellite pointing direction error in an exemplary system.

Figure 9:
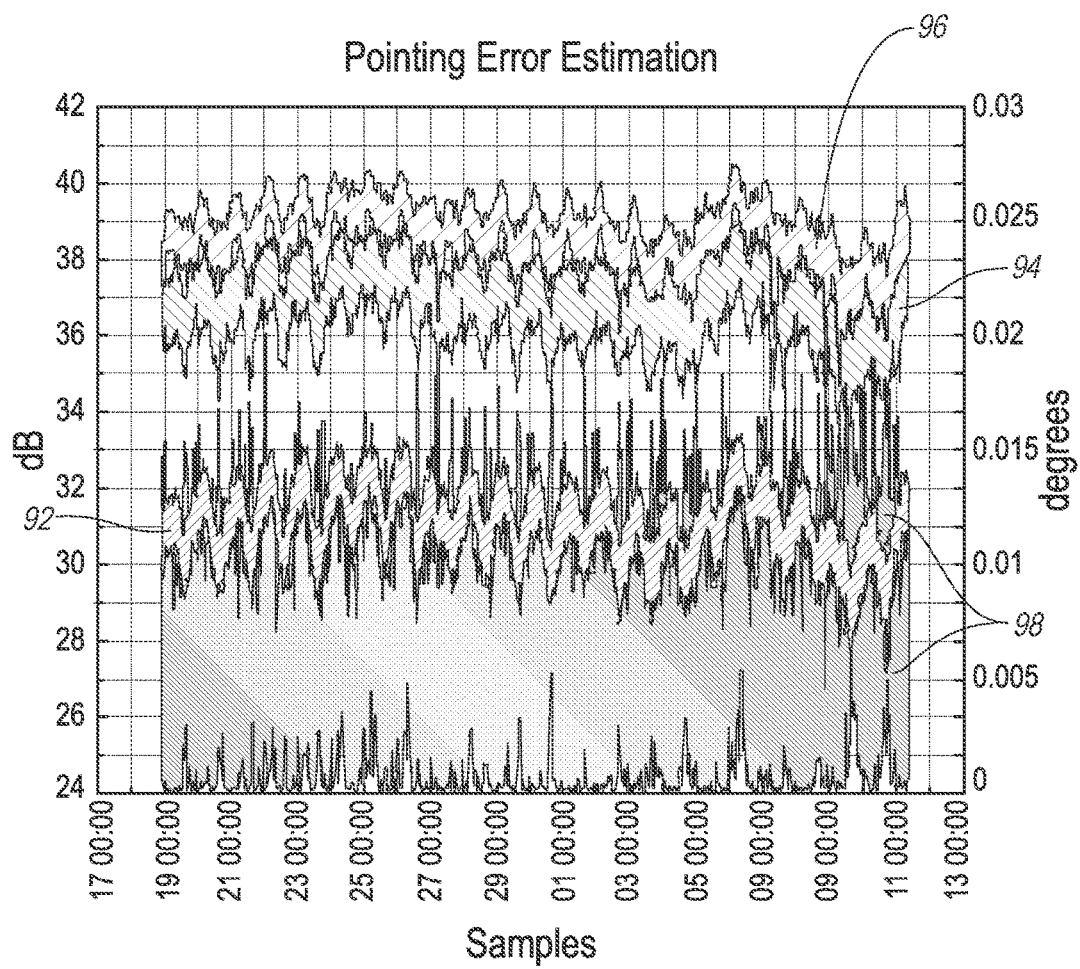

FIG. 9 is a graph showing the result of an exemplary application of the pointing direction estimation algorithm to a real world scenario.

Figure 10:
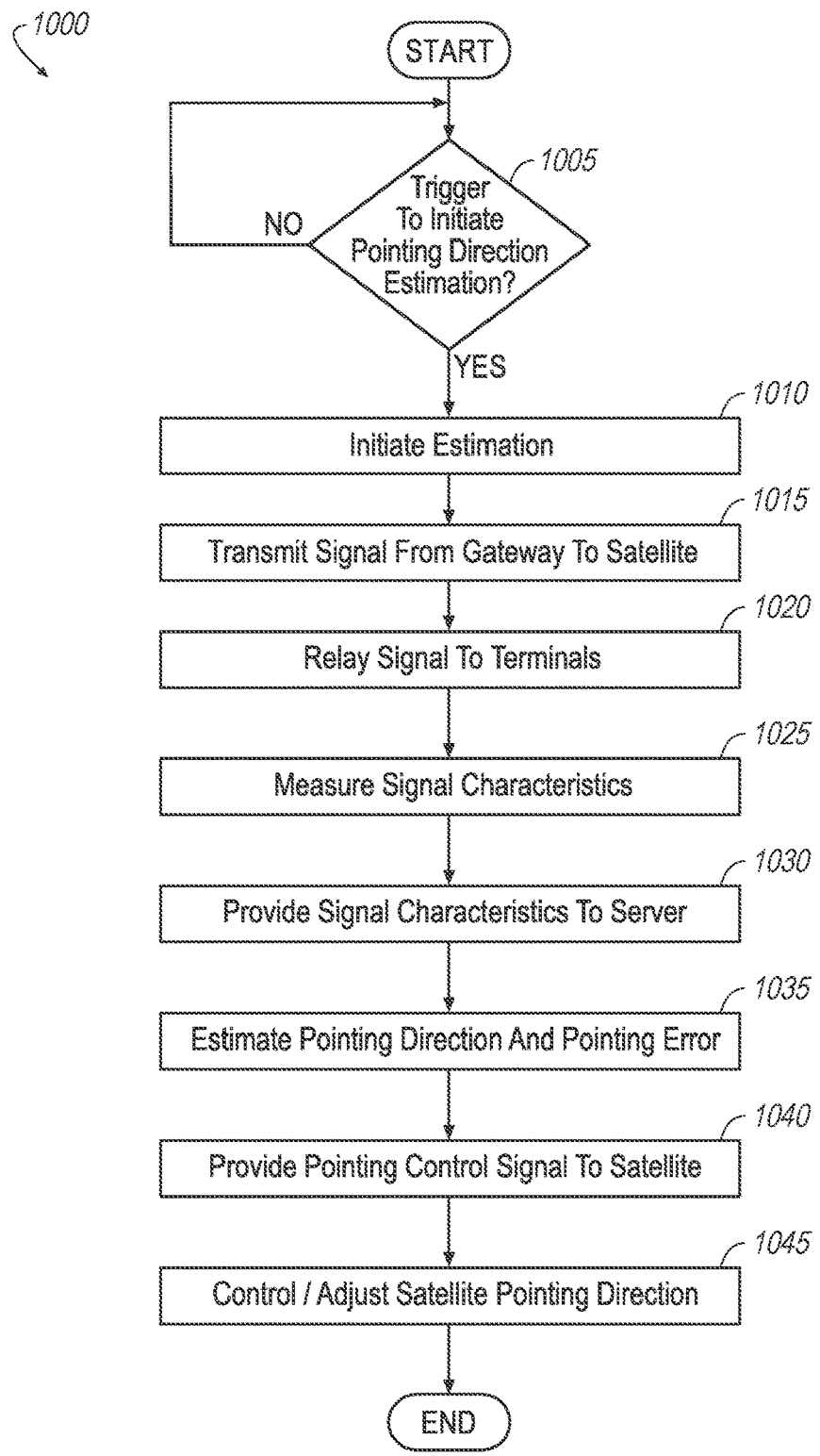

FIG. 10 is a diagram of an exemplary process for estimating and compensating satellite pointing direction error.

DETAILED DESCRIPTION

Exemplary System

Figure 1:
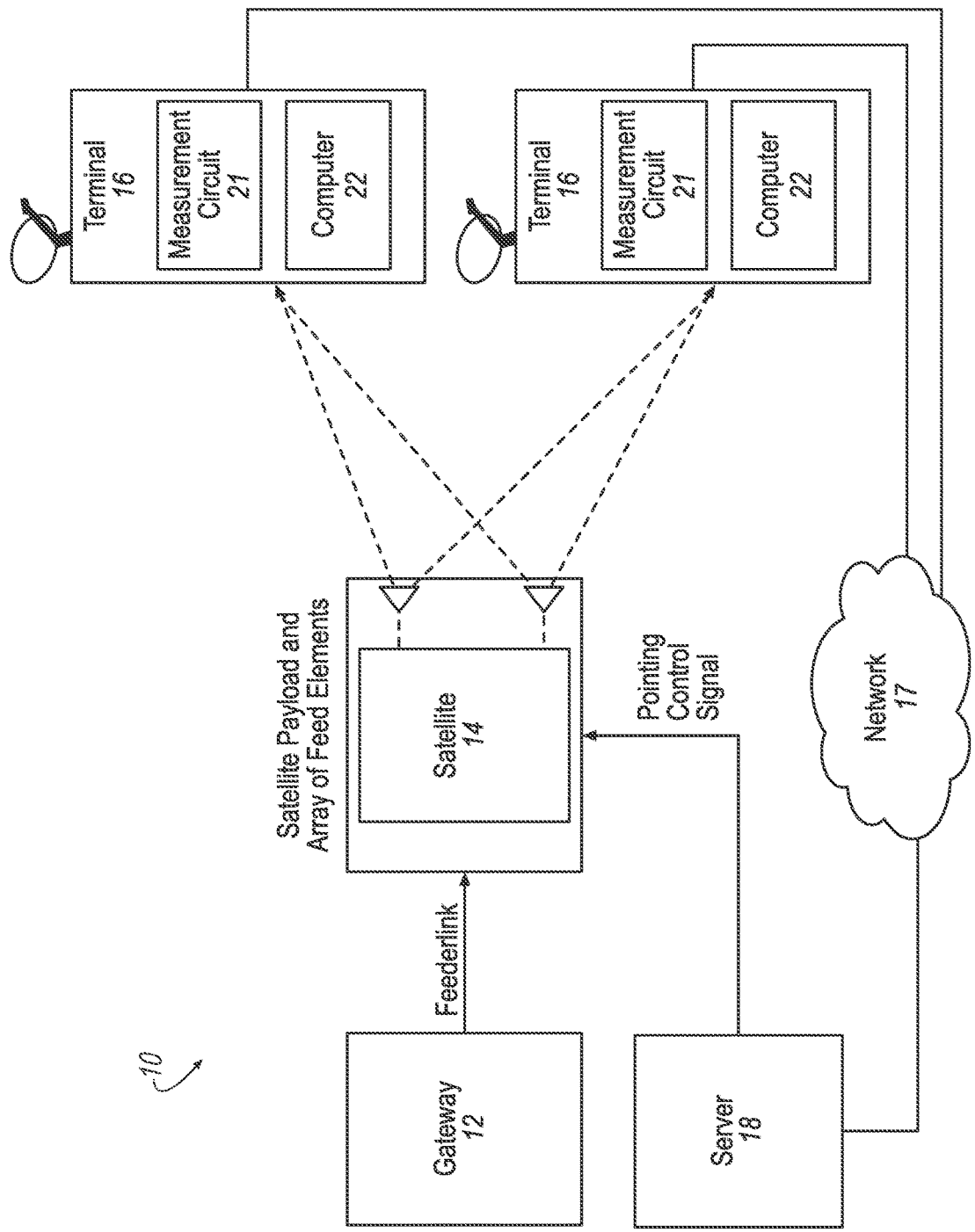
FIG. 1 is a diagram of an exemplary system for estimating and compensating satellite pointing direction error.

Referring to FIG. 1, a system 10 for aggregating signal strength data from a plurality of terminals allows for improved pointing direction estimation. A server 18 collects signal strength data and signal-to-noise ratio (SNR) data from the plurality of terminals 16 based on a transmitted signal from a satellite 14. The server 18 includes or has access to a database of beam patterns. The beam patterns include data indicating the expected beam gain at different locations on the ground for different estimated satellite pointing directions at different points in the satellite's orbit. The satellite pointing direction may also be referred to as the satellite pointing vector herein. The server 18 compares each of the signal strengths with one or more beam gain patterns, wherein each beam gain pattern is a function of a satellite pointing direction. The results may be combined on a weighted basis. For example, a transmission signal with a lower signal-to-noise ratio (SNR) may be given a higher weight than transmission signals with a higher SNR. As another example, a transmission signal received by a terminal 16 located nearer to a peak beam gain (e.g., nearer to a center of a beam lobe) may be given a higher rating than a transmission signal received by a terminal 16 located farther from the peak beam gain. The comparison is performed for different estimates of the satellite pointing direction. The server 18 determines the current estimated satellite pointing direction to be the estimated pointing direction that results in the "best-fit" match of the measured signal strengths and the locally-stored antenna gain patterns. As described in detail below, the "best-fit" estimated satellite pointing direction may be determined by an iterative gradient descent algorithm which determines the estimated satellite pointing direction which results in the minimum mean squared error. The server 18 then compares the estimated satellite pointing direction with the target satellite pointing direction and determines an estimated satellite pointing direction error.

Upon completing the determination of the estimated satellite pointing direction, the server 18 may generate a pointing control signal, and transmit the pointing control signal to the satellite 14. Based on the pointing control signal, the satellite 14 controls the satellite pointing direction, making adjustments for any estimated satellite pointing direction error.

Alternatively, instead of controlling the physical direction of the satellite 14, the estimated pointing direction can be used for software based post-processing that compensates for the error in the satellite pointing direction. This can be implemented by updating the directions of the beams formed by the satellite 14 in a manner that compensates (cancels) the error in the satellite pointing direction. The directions of the beam can be changed digitally by changing coefficients of a beam former 30 (FIG. 2) via a ground based telemetry command. This digital method of pointing correction may be more fuel efficient compared to mechanical orientation of the satellite boresight.

Utilizing the iterative gradient descent algorithm with measurements from a relatively large (compared to other estimation techniques) number of terminals, together with applying a weight to each of the measurements considered in the estimation, may result in a higher accuracy for the estimated satellite pointing direction. Additionally, this approach reduces the computational complexity of estimating the satellite pointing direction in comparison to other estimation methods, and may allow for the correction of short-term satellite pointing error variations, on the order of seconds (since the latency in the measurement feedback and the subsequent estimation procedure at the server 18 is less than a few seconds).

System Elements

Still referring to FIG. 1, a gateway 12 provides, via a satellite uplink, a signal to be transmitted by the satellite 14. The gateway 12 is typically a land-based transmission system such as is known and hosts a number of radio frequency (RF), baseband transport and gateway 12 specific management functions. The gateway 12 may communicate with multiple terminals 16 (via the satellite 14) substantially simultaneously, and generate radio frequency transmissions at power levels sufficient to transmit signals to the satellite 14.

The satellite 14 includes a radio frequency relay station, such as is known. The satellite 14 receives radio frequency signals from the gateway 12 and relays them to one or more terminals 16. The satellite 14 transmits transmission signals to the terminals 16 in one or more transmission beams. A transmission beam as that term is used herein is a concentrated stream of radio waves, and is designed to provide a high gain in a specific geographic area, often referred to as a beam center. The beam gain gradually decreases at locations away from the beam center. At locations farther away from the beam center, the transmission beam may have near zero beam gain. Each transmission beam may be directed to a different location within a coverage area. The coverage area may be, for example, a target geographic area to receive transmission signals from the satellite 14.

As described in additional detail below, the transmission signals, as received by land-based terminals 16, each have an expected beam gain pattern, which is dependent on a satellite pointing direction and the location of the respective land-based terminals 16. A satellite pointing direction indicates a direction of the transmission beam away from the satellite toward the land-based terminals 16 and serves as a reference for determining expected transmission beam gain at locations where the transmission signals are received, e.g., at the locations of land-based terminals 16.

The terminal 16 is typically a communications device for receiving transmission signals from the satellite 14 and providing the transmission signals to, e.g., user devices, such as laptop computers, set-top boxes, smart televisions, etc.

The terminal 16 includes one or more measurement circuits 21 and a computer 22.

The measurement circuit 21 includes electronic circuitry such as is known and is programmed to measure characteristics of the transmission signals received by the computer 22. Characteristics of the transmission signal measured by the measurement circuit include, e.g., the signal strength and the signal-to-noise ratio (SNR), and provide data representing the measurements (measurement data) to the computer 22. Additional characteristics of the transmission signal, such as the transmission signal time and frequency offsets, channel induced amplitude and phase offsets, transmitted modulated symbols, etc., may also be measured by the measurement circuit 21.

The terminal 16 computer 22 includes a processor and a memory, the memory storing instructions executable by the processor, and may be or include one or more microcontrollers, one or more field programmable gate arrays (FPGAs), one or more application specific integrated circuits (ASICs), one or more digital signal processors (DSPs), one or more custom integrated circuits, etc. The terminal 16 computer 22 is programmed to receive transmission signals from the satellite 14 and provide the signals to the measurement circuit 21. The terminal 16 computer 22 is further programmed to receive measurement data from the measurement circuit 21, and transmit the measurement data to the server 18. The measurement data may be transmitted to the server 18 via, for example a wired or wireless network 17, as is known.

The network 17 may comprise one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks, local area networks (LAN) such as a WiFi network or Ethernet, and/or wide area networks (WAN), such as the Internet, etc.

The server 18 is a computing device including a processor and memory. The server 18 is programmed to receive measurement data from one or more measurement circuits 21 indicating characteristics of the transmission signal as received by the respective terminal 16 computers 22. The server 18 is programmed to compare the measurement data from each of the measurement circuits 21 with locally-stored beam gain patterns. The locally-stored beam gain pattern for each is chosen based on an estimated satellite pointing direction and a location of the terminal 16 associated with the respective measurement circuit 21. The comparison is performed for a number of different estimated satellite pointing directions. The server 18 determines the current estimated satellite pointing direction to be the estimated satellite pointing direction that results in the "best-fit" match of the measured transmission signal strengths and the locally-stored antenna gain patterns. As described below, the "best-fit" match may be determined by an iterative gradient descent algorithm which determines the estimated satellite pointing direction which results in the minimum mean squared error.

The server 18 is further programmed to generate a pointing control signal. The server 18 calculates a difference between a target satellite pointing direction, and an estimated actual satellite pointing direction. Based on the calculated difference, the server 18 determines the pointing control signal to adjust the satellite pointing direction, and transmits the pointing control signal to the satellite 14.

Figure 2:
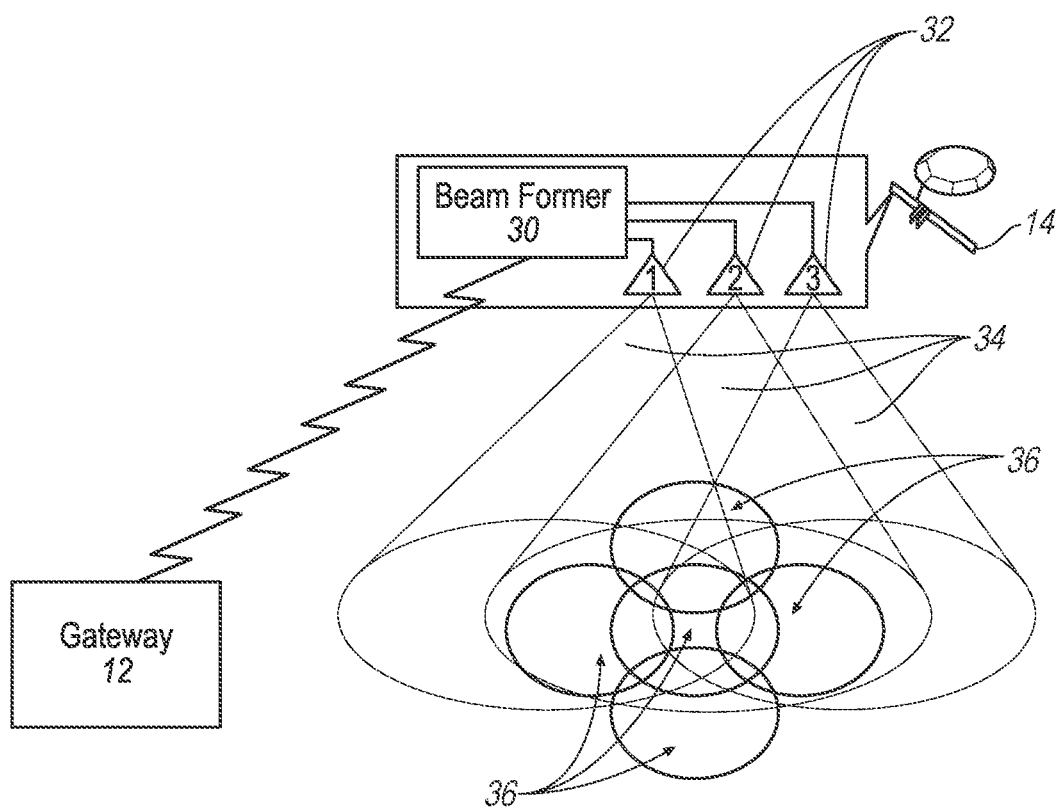
FIG. 2 illustrates an exemplary beam pattern from the exemplary satellite in the system of FIG. 1.

Referring to FIG. 2, the satellite 14 includes one or more beam formers 30. The beam former 30 may generate a transmission signal or set of transmission signals to be transmitted to the earth, via one or more antennas 32. The transmitted signals are transmitted in beams 34, i.e., concentrated streams of radio waves. As shown in FIG. 2, the satellite may include, for example, three antennas 32. Each antenna may transmit beams 34 including the transmission signals. The beams 34 may be formed by the beam former 30 such that primary spot beams 36 are formed at ground level. The primary spot beams 36 may indicate a target area where a strength of the transmission signal is expected to be above a predetermined threshold. The measured signal levels on the ground are determined by downlink gain profiles of the various beams 34 formed by the one or more antennas 32. These satellite beam gain profiles are often defined and available on a satellite antenna U-V plane, discussed below.

Figure 3:
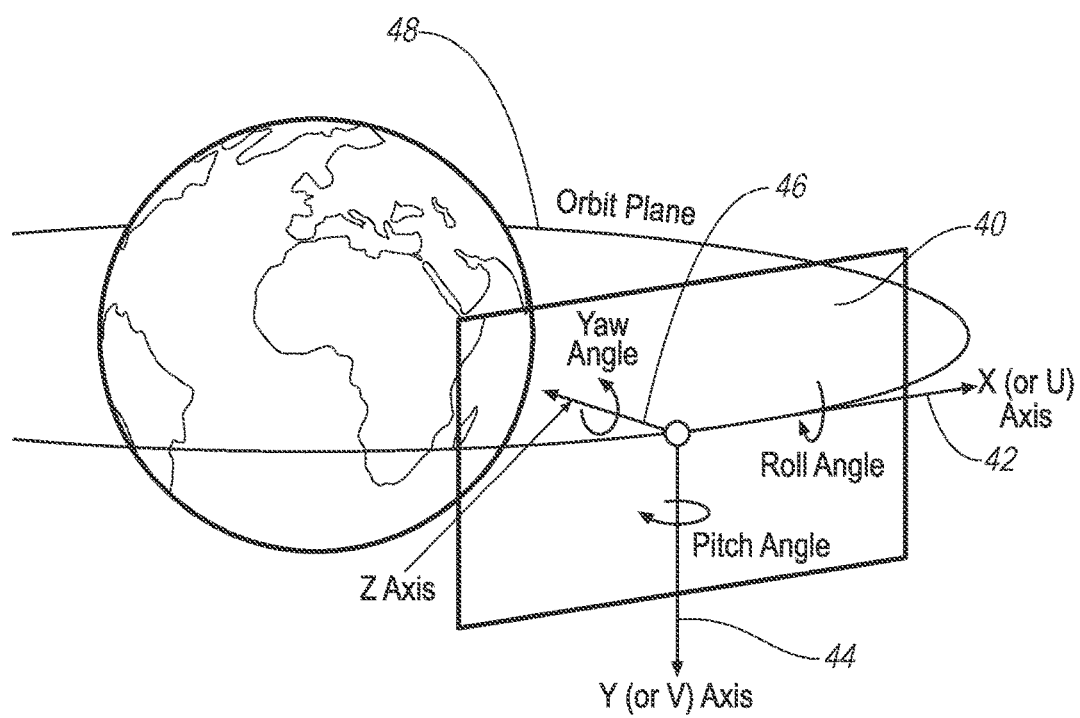
FIG. 3 is a diagram of an exemplary antenna U-V plane associated with the exemplary satellite of FIG. 1.

FIG. 3 illustrates an exemplary U-V antenna plane 40 for one or more antennas 32 (typically, an array of antennas 32), on a satellite 14. The satellite 14 orbits around the earth along an orbit plane 48. The U-V antenna plane 40 extends along an X axis 42 (also referred to as a U axis 42) and a Y axis 44 (also referred to as a V axis 44). The U axis 42 extends tangentially from the orbit plane 48 along a direction of the satellite 14 orbit. The V axis 44 extends tangentially from the orbit plane 48 in a direction perpendicular to the direction of orbit. A W axis 46 extends towards the ground (earth) in a direction perpendicular to the satellite antenna U-V plane 40. The W axis 46 may be referred to herein as the antenna boresight 46.

As shown in FIG. 3, the antenna U-V plane 40 may rotate around each of the U, V and W axes. The angle of the U-V plane 40, with respect to the ground, around the U axis is referred to as the roll angle. The angle of the U-V plane 40 with respect to ground, around the V axis is referred to as the pitch angle. The angle of the U-V plane, with respect to the W axis 46 (boresight 46) is referred to as the yaw angle. The satellite pointing direction may be defined in terms of the U-V plane 40 and the roll angle pitch angle and yaw angle. The roll angle, pitch angle and yaw angle may be collectively referred to as the roll-pitch-yaw (RPY) pointing angles.

Figure 4:
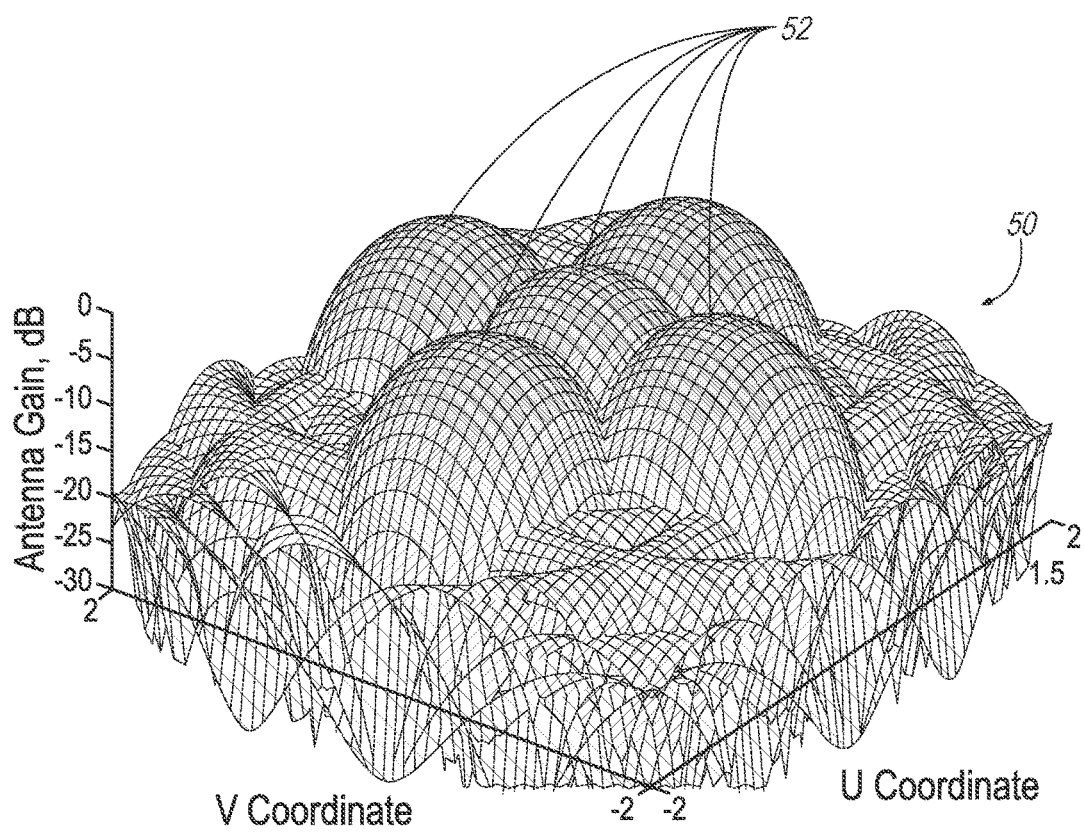
FIG. 4 is a graph of beam gain pattern showing signal gain in the U-V plane.

A three dimensional representation of an exemplary beam gain profile 50 defined over the satellite U-V plane 40 is shown in FIG. 4. An exemplary gain profile of the transmission signal is represented by respective spot beam lobes 52. The exemplary spot lobes 52 indicate that the antenna gain varies according to a location of, e.g., a terminal 16 relative to the U-V plane 40. Small perturbations in the RPY pointing angles can result in an imprecise orientation of the satellite antenna U-V plane 40 relative to the targeted antenna pointing direction.

Figure 5:
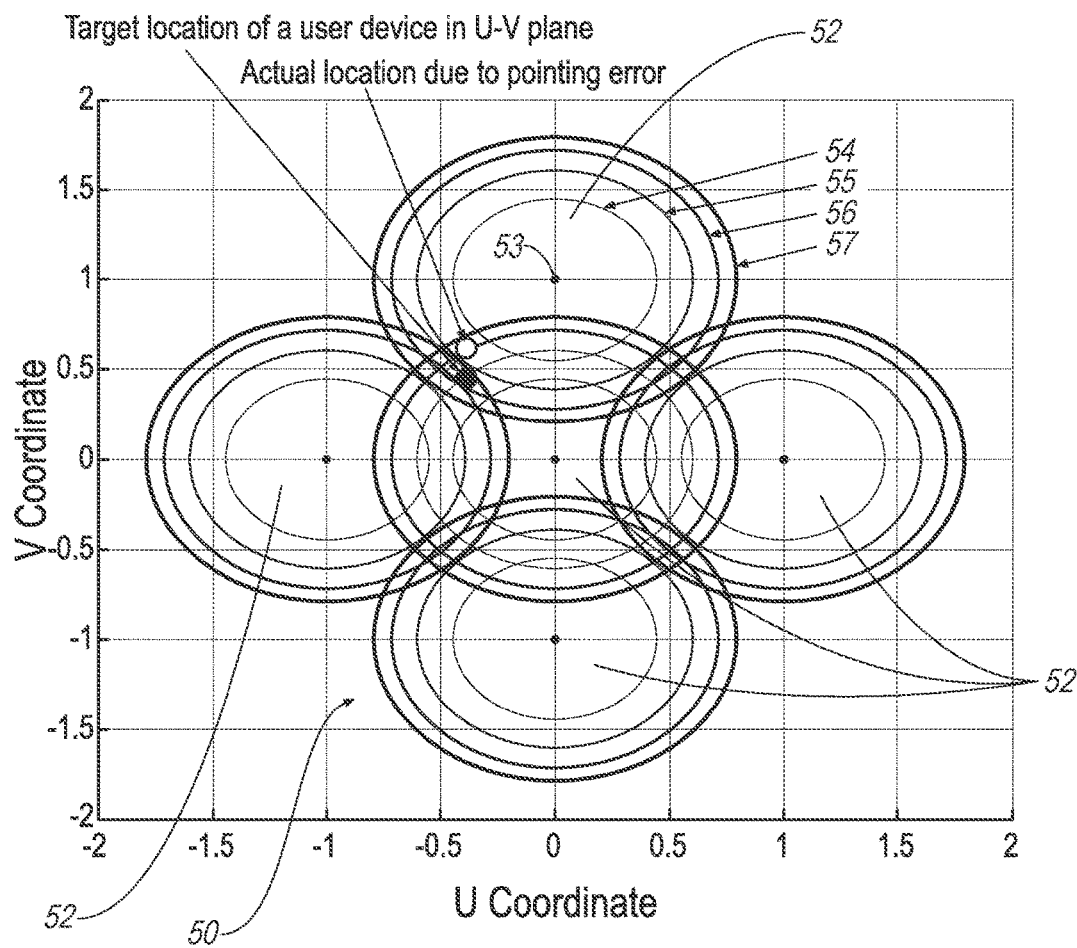
FIG. 5 is a graph of a beam gain pattern showing a target and an apparent location of a terminal in the U-V plane of a satellite due to satellite pointing direction error.

An example of the effect of the satellite pointing error is illustrated in FIG. 5. FIG. 5 includes a beam gain profile 50 including five spot beam lobes 52. Each of the spot beam lobes 52 includes a center 53, a −3 decibel (dB) contour 54, a −6 dB contour 55, a −9 dB contour 56 and a −12 dB contour 57. The 3 dB contour 54, for example, indicates that a location where the signal strength is 3 dB weaker than the signal strength at the spot beam 52 center 53. FIG. 5 shows that a terminal 16, at a specific nominal location in the U-V plane 40, experiences a different gain level in the presence of the pointing errors due to an apparent shift of its location in the U-V plane 40.

The satellite pointing error has the undesirable consequence of changing the beam gain profile 50 over the ground compared to a planned beam gain profile 50. In a beam gain profile 50 such as the beam gain profile 50 shown in FIG. 5, a large uncorrected pointing error can cause a significant impact. A link analyses that projects a link closure at the edge of a beam coverage, e.g., near the edge of a spot beam lobe 52, may turn invalidated. The terminal 16 may "roll-off", due to the pointing error, from, e.g., an edge of a spot beam lobe 52, where the link is designed to close, towards a location where the link may not close, or, at least, the link may have an appreciably deteriorated margin. Closing, as that term is used in the present context, refers to establishing communications, between the terminal 16 and the satellite 14.

Determining, and compensating, the satellite pointing error can thus result in improved strength of the satellite transmission signal as received by the terminals 16, by correcting the apparent position of the terminal 16 in the U-V plane 40 to more closely match the planned position of the terminal 16 within the U-V plane 40.

Figure 6:
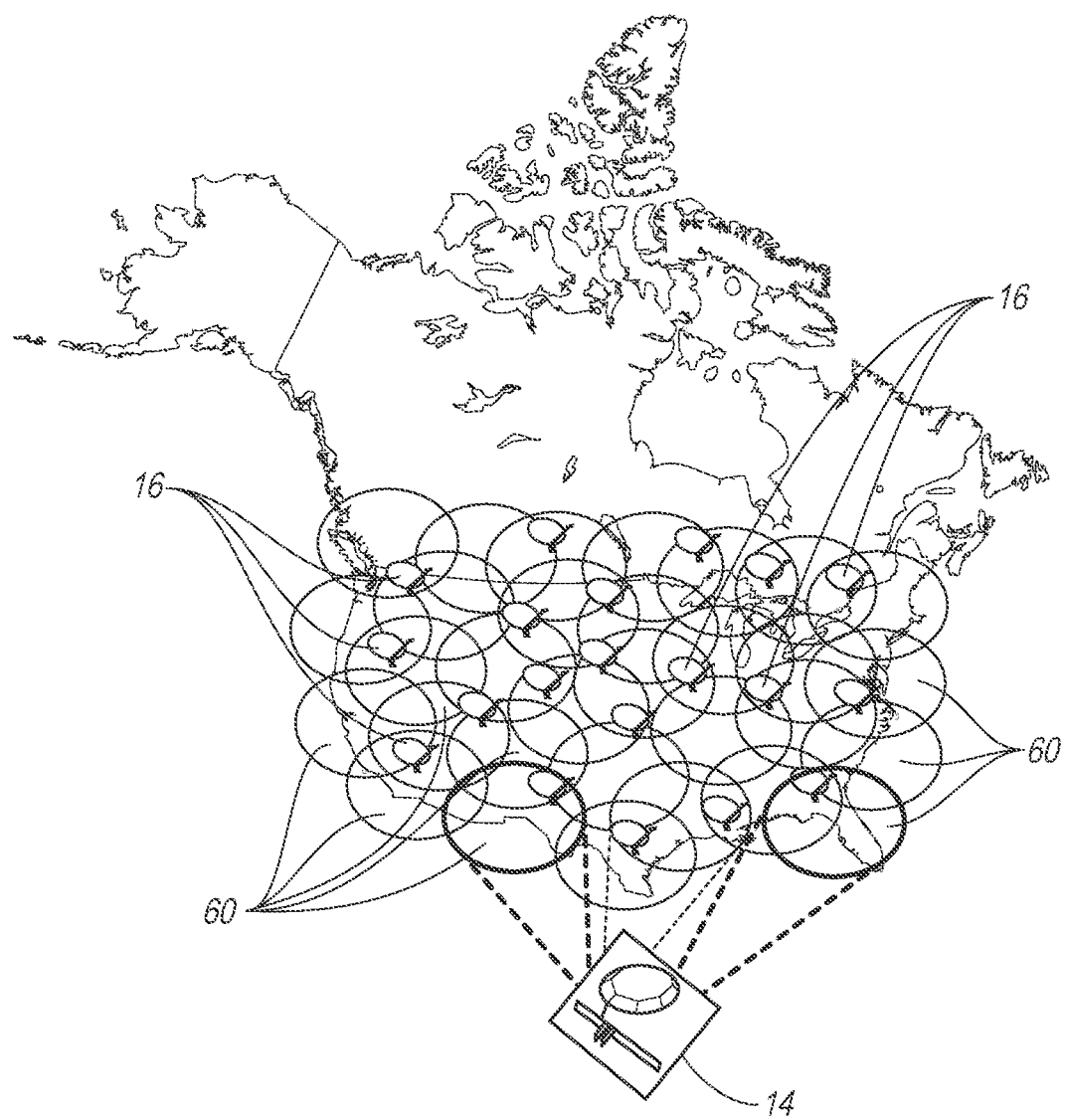
FIG. 6 is an exemplary map illustrating an exemplary distribution of terminals in a geographic area.

As discussed above, beam gain level measurements at multiple terminals 16 on the ground can be utilized to estimate and compensate for satellite pointing errors. As shown in FIG. 6, a satellite may transmit a plurality of different satellite beams 60. The satellite beams 60 may be overlapping.

Further as shown in FIG. 6, the satellite beams 60 may be received by plurality of terminals 16, at different locations. As discussed above, each of the terminal 16 measurement circuits 21 may measure characteristics of the received transmission signal, and provide the measurement data to a server 12. The server 12 may, based on the data, estimate a satellite pointing error. A method for estimating the satellite pointing error is discussed in additional detail below.

Algorithmic Description

Let $m \in 1, \ldots, M$ denote the index of the measurement circuit 21 at which satellite signal measurement $r_m$ is available. For the sake of simplicity, we model the measurement $r_m$ as follows:

$$r_m = G_m(p) + w_m \quad \text{(Eqn. 1)}$$

Here, $w_m$ is a measurement noise, and $G_m(p)$ is the beam gain from the satellite 14 to $m^{th}$ measurement location. The beam gain is, thus, a multi-dimensional function. A first dimension is the location on the earth; and the other three dimensions form a vector $p=[p_1, p_2, p_3]$ of the satellite-centric pointing errors (i.e., the $p_1$=Roll, $p_2$=Pitch and $p_3$=Yaw errors; alternatively, p can be modeled as two dimensional vector [u, v] of errors in the U-V plane).

With M locations at which the measurements $\{r_n\}$ are available, the above nonlinear relationship can be written in a vector form $r=f(p)$.

In a case where the model does not fully represent the system architecture, $w_m$ may additionally include model noise. In some cases, the model noise may not be relevant for estimating the satellite pointing direction. In other cases, additional unknowns may require estimation. In the latter case, the estimation framework in Eqn. 1 needs to be enhanced to account for these additional variables. The additional unknowns may arise due to either or both of the implementation of the beam former 30 and the implementation of the terminals 16. The radio-frequency characteristics due to the specific implementation methodology may lead to these additional unknowns besides the three satellite pointing parameter r, p and y, of interest. In this case, the estimation framework in Eqn. 1 may need to be extended to account for these additional variables by defining vector p to have, besides the three satellite pointing variables r, p and y of interest, one or more additional unknowns that affect the measurement vector r.

The problem of estimation of satellite pointing error estimation belongs to a general class of the problem of finding the roots of a nonlinear equation; i.e., given the measurement $r=f(p)$, determine the unknown pointing error vector $p=f^{-1}(r)$.

The generalized nonlinear functional relation $f(\circ)$, that determines the vector r of the measurements at M locations for a given satellite pointing vector p, is not invertible in a closed form manner. However, the solution is still searchable by a numerical method. For example, a brute-force (and, therefore, computationally inefficient and possibly intractable) approach is to feed each possible realization of the pointing vector p to the above function $f(\circ)$ until the output r of the function exhibits the closest match with the observed r.

A more efficient method is the Gauss-Newton (GN) scheme for iterative root-finding. The GN algorithm belongs to the class of nonlinear programming techniques, and it performs a gradient descent search of the root. This is described next.

The GN scheme is an extension of the Newton's method for root finding, which inverts a nonlinear function $r=f(p)$ given its output r by finding the solution=$f^{-1}(r)$. Derivative function $$J(p) = \frac{dr}{dp} = f'(p)$$

is assumed to be well defined and known.

Newton's method is initialized with an estimate $p_0$ of the solution. The initial estimate may be, e.g., (i) the boresight 46 (which assumes that the pointing error is zero), (ii) an average of recent pointing error estimates, if available, or (iii) a-priori knowledge about the likely satellite pointing error, if available based on an orbital analysis.

Given the known function value $r_0=f(p_0)$, and the derivative $J(p_0)$ at the initial solution estimate $p_0$, the following equality is used to improve the estimate of the root.

$$J(p_0) = \frac{r - r_0}{p_1 - p_0} \Rightarrow p_1 = p_0 + J^{-1}(p_0)(r - r_0) \quad \text{(Eqn. 2)}$$

The above process is iterated (from iteration n to n+1) as follows:

$$e_n = r - r_n = r - f(p_n) \quad \text{(Eqn. 3)}$$

$$p_{n+1} = p_n + J^{-1}(p_n)e_n \quad \text{(Eqn. 4)}$$

This results in an iterative descent to the desired root as shown in FIG. 7, wherein the variable y is analogous to vector r of satellite signal measurements and the variable θ is analogous to vector p of unknown pointing directions.

The Gauss-Newton (GN) method for estimating the satellite pointing direction, described below, operates in a multidimensional space, and is therefore difficult to visualize. FIG. 7, is a scalar (one-dimensional) representation, which illustrates the approach behind the GN method.

The Newton's method is extended to the vector case by Gauss-Newton (GN) method.

The GN method finds the root of the vector problem r=f(p) given an initial estimate $p_0$. Derivative function, i.e., the Jacobian matrix $$J(p) = \frac{dr}{dp},$$

defined as follows, is assumed to be known.

$$J(p) = \begin{bmatrix} \frac{\partial f_1(p)}{\partial p_1} & \frac{\partial f_1(p)}{\partial p_2} & \frac{\partial f_1(p)}{\partial p_3} \\ \vdots & \ddots & \vdots \\ \frac{\partial f_M(p)}{\partial p_1} & \frac{\partial f_M(p)}{\partial p_2} & \frac{\partial f_M(p)}{\partial p_3} \end{bmatrix}_{M \times 3} \quad \text{(Eqn. 5)}$$

The Jacobian J(p) shown here of size M×3 is applicable in scenarios when the parameters to be estimated are the three unknown pointing variables $p_1=r$, $p_2=p$, and $p_3=y$. As stated above, in scenarios with a greater number, e.g. Y≤M, of unknowns, vector p becomes a Y×1 vector and Jacobian J(p) becomes a M×Y matrix.

The GN method is initialized with an estimate $p_0$ of the solution. Given the known function value $r_0=f(p_0)$ and the derivative $J(p_0)$ at the initial solution n=0, iterations proceed from n to n+1 as follows:

$$e_n = r - r_n = r - f(p_0) \quad \text{(Eqn. 6)}$$

$$p_{n+1} = p_n + J^+(p_0)e_n \quad \text{(Eqn. 7)}$$

Here, $J^+(p_0)$ is the pseudo-inverse of the Jacobian matrix. Comparing the GN method to Newton's method, it is seen that the equations bear a strong similarity. The key difference is the Least Squares solution used in the GN method to the possibly overdetermined system of linear equations.

Following is a summary of the algorithm for estimation of pointing errors based on the GN approach.

1. $r = [r_1, r_2, \ldots, r_M]^T$ is the measured M tuple of the satellite beam measurements at different measurement circuits 21.
   a. The assumption is that the measurement vector r can be modeled as shown in Eqn. 1, i.e., as being directly proportional to the satellite antenna beam gain $G_m(p)$ corresponding to $m^{th}$ measurement, plus some additive impairment, i.e., as $G_m(p)+w_m$.
   b. The measurement collection may require transmission of a known beacon signal that is received at the terminal 16 measurement circuit 21 at a level proportional to $G_m(p)$. In some implementations of the measurement circuit 21, the actual measurement may be affected by a constant of proportionality. Normalization of the received signal level (e.g., by the estimated noise level, or by a similar level measurement performed on a reference beam) may be required to that the measurement $R_m$ can be cast in the model shown in equation 1.
   c. The number of measurement circuits 21 may be smaller than M if one or more measurement circuit 21 are used to collect multiple elements of vector r on different antenna beams.

2. The algorithm is initialized with iteration index n=0. The estimate of the satellite pointing error $\hat{p}_n$ at n=0$^{th}$ iteration is initialized by the best available knowledge of the satellite pointing vector. The best available knowledge may be, for example, that the satellite pointing direction is equal to the boresight 46 (target satellite pointing direction) at a time of the current measurement (i.e., that there is no satellite pointing error). As another example, the best available knowledge may be historical data indicating a typical pointing error of the satellite 14 at a given point in the satellite orbit, or results from recent (e.g., within the last five minutes) estimates of the satellite pointing error, etc.

3. Given the formed estimate $\hat{p}_n$ of the satellite pointing error, the expected measurement vector is calculated as $r_n = f(\hat{p}_n)$, and the corresponding estimation error vector $e_n = r - r_n$ and the mean squared error (MSE) $e_n = (e(n))^T e(n)$ are computed.
   a. If $e_n$ is less than (for example) TOL [=10$^{-6}$], or if (for example) n>$n_{max}$[=100], the iterations are terminated and the output (the estimate of the pointing error $\hat{p}_n$, and the confidence in the estimate) is generated. Otherwise, the iterations are continued.

4. The Jacobian matrix of the partial derivative matrix at the present estimate of the pointing error vector $\hat{p}_n$ is computed as follows (here, the pointing vector to be estimated is taken as a three-tuple (e.g., Roll, Pitch and Yaw) and, therefore, the Jacobian J is shown as having dimension M×3; alternatively, only U and V elements may need to be estimated, in which case the pointing vector p has two elements and the dimension of the Jacobian J is M×2).

$$J_n(\hat{p}_n) = \begin{bmatrix} \frac{\partial f_1(\hat{p}_n)}{\partial \hat{p}_1(n)} & \frac{\partial f_1(\hat{p}_n)}{\partial \hat{p}_2(n)} & \frac{\partial f_1(\hat{p}_n)}{\partial \hat{p}_3(n)} \\ \vdots & \ddots & \vdots \\ \frac{\partial f_M(\hat{p}_n)}{\partial \hat{p}_1(n)} & \frac{\partial f_M(\hat{p}_n)}{\partial \hat{p}_2(n)} & \frac{\partial f_M(\hat{p}_n)}{\partial \hat{p}_3(n)} \end{bmatrix}_{M \times 3} \quad \text{(Eqn. 8)}$$

5. The pointing solution vector is updated as:

$$\hat{p}_{n+1} = \hat{p}_n + (J_n^T(\hat{p}_n) W J_n(\hat{p}_n))^{-1} J_n^T(\hat{p}_n) \times W \times e_n \quad \text{(Eqn. 9)}$$

a. Matrix W is the inverse of the cross-covariance matrix of the measurement vector r, and it is set in proportion to the measurement SNR and a distance from a beam peak gain. Thus, the greater the measurement SNR and the smaller the distance of the measurement circuit 21 from the location corresponding to the peak beam gain, the higher the weight used in the corresponding element of matrix W.

6. Iteration index is incremented (n←n+1), and procedure repeats starting from step 3.

The above pointing algorithm is simulated using the artificial five-beam geometry shown in FIG. 5. A quick convergence to the simulated pointing error is observed in FIG. 8. The line 80 represents the estimated yaw error 80, line 82 represents the estimated pitch error and line 84 represents the estimated roll error. The initial estimated yaw error is indicated by the data point 86, the initial estimated pitch error is indicated by the data point 88 and the initial estimated roll error is indicated by the data point 90. The result converges on the pointing error within five iterations or less.

The convergence of the algorithm is critically dependent on the initial seed used. However, the algorithm sensitivity to the initial seed selection improves by a proper choice of the weighting matrix W. As discussed above, the initial estimate may be, e.g., (i) the boresight 46 (which assumes that the pointing error is zero), (ii) an average of recent pointing error estimates, if available, or (iii) a-priori knowledge about the likely satellite pointing error, if available based on an orbital analysis. Furthermore, the algorithm convergence improves with the increasing dimension of vector r, which increases with the number of measurement circuits 21.

FIG. 9 illustrates a simulation for estimating the satellite pointing error based on signal strength data from three terminals 16, wherein each of the terminals 16 is located within a different beam pattern from the satellite 14. The simulation is based on a set of real world data. The signal trace 92 indicates signal strength data from a first terminal 16, signal trace 94 indicates signal strength data from a second terminal 16, and signal trace 96 indicates signal strength data from a third terminal 16. The signal trace 98 indicates the norm of the pointing error vector p=[u, v]. The norm of the pointing error vector may be calculated as $p=\sqrt{u^2+v^2}$.

As can be seen from the signal trace 98, the estimated pointing error is a small fraction of a degree. The estimated result is consistent with expected real-world satellite behavior, and indicates that the estimation algorithm may be successfully applied to an operational satellite.

Exemplary Process Flow

FIG. 10 is a diagram of an exemplary process 1000 for estimating and compensating satellite pointing direction error. The process 1000 starts in a block 1005.

In the block 1005, a computing device, for example the server 18 determines whether a trigger event has occurred to initiate a satellite pointing direction estimation. The trigger event may be the occurrence of a periodic time, such as once every five minutes, or once every hour. As another example, the occurrence may be the satellite 14 being in a particular location within the orbit plane 48 of the satellite 14. Other examples include a report from one or more terminals 16 that the terminals 16 lost communications with the satellite 14, input from a user (e.g., an operator of the server 18 or the gateway 12) requesting the satellite pointing direction estimation, etc. The examples of trigger events listed above are non-limiting. Upon determining that a trigger event has occurred, the process 1000 continues in a block 1010.

In the block 1010, the server 18 initiates the satellite pointing direction estimation. The server 18 may send an instruction to the gateway 12, to transmit a signal to the satellite 14. The instructions may include parameters related to the satellite pointing direction estimation, such as, which satellite 14 is to be the subject of the satellite pointing direction estimation, which terminals 16 should receive transmission signals from the satellite 14, etc.

Upon receiving instructions from the server 18 by the gateway 12, the process 1000 continues in a block 1015.

In the block 1015, the gateway 12 generates and transmits a transmission signal to the satellite 14. The transmission signal may include standard communications (e.g., media content for television programming), and/or signal elements to facilitate signal measurements. For example, the signal may include a particular data pattern, called Unique Word, or Training Sequence, or a Preamble, Midamble or Postamble, as are known, which may be used to determine the quality of a transmission. The data pattern may either be lumped together at the beginning, middle or end of the data frame, or interlaced throughout the data frame. This data pattern is known at the receiver and allows the receiver to estimate SNR, which is used in the calculation of the weighting matrix W. Upon transmitting the transmission signal to the satellite 14, the process continues in a block 1020.

In the block 1020, the satellite 14 relays the transmission signal to a plurality of terminals 16. As described above, the satellite 14 transmits the transmission signal in a plurality of transmission beams. Each transmission beam is targeted for a particular area within a coverage region. As further described above, the transmission beams may be overlapping, and may be described according to beam gain profiles. The beam gain profiles indicate the transmission signal strength at a particular location within the beam. Upon transmitting the plurality of transmission beams, the process 1000 continues in a block 1025.

In the block 1025, a plurality measurement devices 21, included in terminals 16, measure characteristics of the transmission signals received by the terminals 16. The characteristics may include the strength of the transmission signal as received by the terminal 16, and a signal-to-noise ratio of the signal as received by the terminal 16. Upon measuring the characteristics of the transmission signal by each of the measurement devices 21 for each of the terminals 16, the process 1000 continues in a block 1030.

In the block 1030, the terminals 16 may transmit measurement data indicating characteristics of the transmission signal as received by each of the respective terminals 16, to the server 18. The measurement data may be transmitted together with other indicia, such as an identification of the terminal 16 providing the data, a time the data was measured, etc. The process 1000 continues in a block 1035.

In the block 1035, the server 18 estimates, based on the measurement data received from the plurality of terminals 16, a satellite pointing direction. The estimation is performed based on the estimation is performed based on an iterative gradient descent algorithm, as described above. The server 18 further determines, based on the estimated satellite pointing direction, an estimated satellite pointing direction error. The process 1000 continues in a block 1040.

In the 1040, the server 18 generates, based on the estimated satellite pointing direction, and/or the estimated satellite pointing direction error, a satellite pointing control signal, and transmits the satellite pointing control signal to the satellite 14. In the case that there is an estimated satellite pointing control error, the pointing control signal may provide instructions for compensating the estimated error. The process 1000 continues in a block 1045.

In the block 1045, the satellite 14 controls the satellite pointing direction, adjusting the pointing direction to compensate for the estimated satellite pointing direction error. Upon controlling/adjusting the satellite pointing direction, the process 1000 ends.

CONCLUSION

As used herein, the adverb "substantially" means that a shape, structure, measurement, quantity, time, etc. may deviate from an exact described geometry, distance, measurement, quantity, time, etc., because of imperfections in materials, machining, manufacturing, etc.

The term "exemplary" is used herein in the sense of signifying an example, e.g., a reference to an "exemplary widget" should be read as simply referring to an example of a widget.

Networked devices such as those discussed herein generally each include instructions executable by one or more networked devices such as those identified above, and for carrying out blocks or steps of processes described above. For example, process blocks discussed above may be embodied as computer-executable instructions.

Computer-executable instructions may be compiled or interpreted from computer programs created using a variety of programming languages and/or technologies, including, without limitation, and either alone or in combination, Java™, C, C++, Python, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in a networked device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with rules of holes, a RAM, a PROM, an EPROM, a FLASH-EEPROM, any other memory chip or cartridge, or any other medium from which a computer can read.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A system comprising a computer programmed to:
receive, from each of a plurality of signal measurement circuits, data indicating a strength and a signal-to-noise ratio of a transmission signal received from a satellite by the respective measurement circuit;
set, for each measurement circuit, a weighting function based on the respective signal-to-noise ratio and a distance of the measurement circuit from a respective peak beam gain based on an estimated satellite pointing direction;
compare, for each of a plurality of estimated satellite pointing directions, the strength of the transmission signal received respectively by each measurement circuit with an expected strength of the transmission signal for the respective measurement circuit, the plurality of estimated satellite pointing directions selected based on an iterative gradient descent algorithm;
determine a respective estimation error vector for each estimated satellite pointing direction based on (a) a difference between the strengths of the transmission signal received and the expected strength respectively for each measurement circuit, and (b) the respective weighting function;
determine, based on one of the respective estimation error vectors being less than a predetermined threshold, a current estimated satellite pointing direction;
determine, based on the current estimated satellite pointing direction, a control signal to adjust a satellite pointing direction; and
provide the control signal to the satellite.

2. The method of claim 1, wherein the plurality of estimated satellite pointing directions includes an initial estimated satellite pointing direction and one or more subsequent estimated satellite pointing directions, and each of the one or more subsequent estimated satellite pointing directions is selected based on the iterative gradient descent algorithm.

3. The system of claim 2, wherein the iterative gradient descent algorithm performs a nonlinear iterative least-squares descent to an estimated satellite pointing direction that minimizes a mean squared hypothesis error.

4. The system of claim 2, wherein the initial estimated satellite pointing direction is based on a target satellite pointing direction for a current time.

5. The system of claim 2, wherein the initial estimated satellite pointing direction is based on a previously determined satellite pointing direction.

6. The system of claim 1, wherein the weighting function is set such that a contribution of a measured signal strength to determining the respective estimation error vector increases as the corresponding signal-to-noise ratio increases.

7. The system of claim 1, wherein the computer is further programmed to determine the respective estimation error vector from each estimated satellite pointing direction based on measurements from at least 10 measurement circuits.

8. The system of claim 1, further comprising the satellite, wherein the satellite is programmed to:
adjust, based on the control signal, the pointing direction of the satellite.

9. The system of claim 1, further comprising the satellite, wherein the satellite is programmed to:
adjust, based on the control signal, a beam direction relative to the satellite.

10. A method comprising:
receiving, by a computer, from each of a plurality of signal measurement circuits, data indicating a strength and a signal-to-noise ratio of a transmission signal received from a satellite by the respective measurement circuit;
setting, for each measurement circuit, a weighting function based on the respective signal-to-noise ratio and a distance of the measurement circuit from a respective peak beam gain based on an estimated satellite point direction;
comparing, for each of a plurality of estimated satellite pointing directions, the strength of the transmission signal received respectively by each measurement circuit with an expected strength of the transmission signal for the respective measurement circuit, the plurality of estimated satellite pointing directions selected based on an iterative gradient descent algorithm;
determining a respective estimation error vector for each estimated satellite pointing direction based on (a) a difference between the strength of the transmission signal received and the expected strength respectively for each measurement circuit, and (b) the respective weighting function;
determining, based on one of the respective estimation error vectors being less than a predetermined threshold, a current estimated satellite pointing direction
determining, based on the current estimated satellite pointing direction, a control signal to adjust a satellite pointing direction; and
providing the control signal to the satellite.

11. The method of claim 10, wherein the plurality of estimated satellite pointing directions includes an initial estimated satellite pointing direction and one or more subsequent estimated satellite pointing directions, and each of the one or more subsequent estimated pointing directions is selected based on the iterative gradient descent algorithm.

12. The method of claim 11, wherein the iterative gradient descent algorithm performs a nonlinear iterative least-squares descent to an estimated satellite pointing direction that minimizes a mean squared hypothesis error.

13. The method of claim 11, wherein the initial estimated satellite pointing direction is based on a target satellite pointing direction for a current time.

14. The method of claim 11, wherein the initial estimated satellite pointing direction is based on a previously determined satellite pointing direction.

15. The method of claim 10, wherein the weighting function is set such that a contribution of a measured signal strength to determining the respective estimation error vector increases as the corresponding signal-to-noise ratio increases.

16. The system of claim 10, further comprising determining the respective estimation error vector for each estimated satellite pointing direction based on measurements from at least 10 measurement circuits.

17. The system of claim 10, further comprising:
adjusting, based on the control signal, the pointing direction of the satellite.

18. The system of claim 10, further comprising:
adjusting, based on the control signal, a beam direction relative to the satellite.

* * * * *